Jan. 20, 1942.  W. E. MALLORY  2,270,540
PROCESS OF TREATING LIQUIDS
Filed Feb. 16, 1938  2 Sheets-Sheet 1

INVENTOR
Wilhelm E. Mallory.
BY
Harness, Dickey & Pierce.
ATTORNEYS.

Jan. 20, 1942.  W. E. MALLORY  2,270,540
PROCESS OF TREATING LIQUIDS
Filed Feb. 16, 1938   2 Sheets-Sheet 2
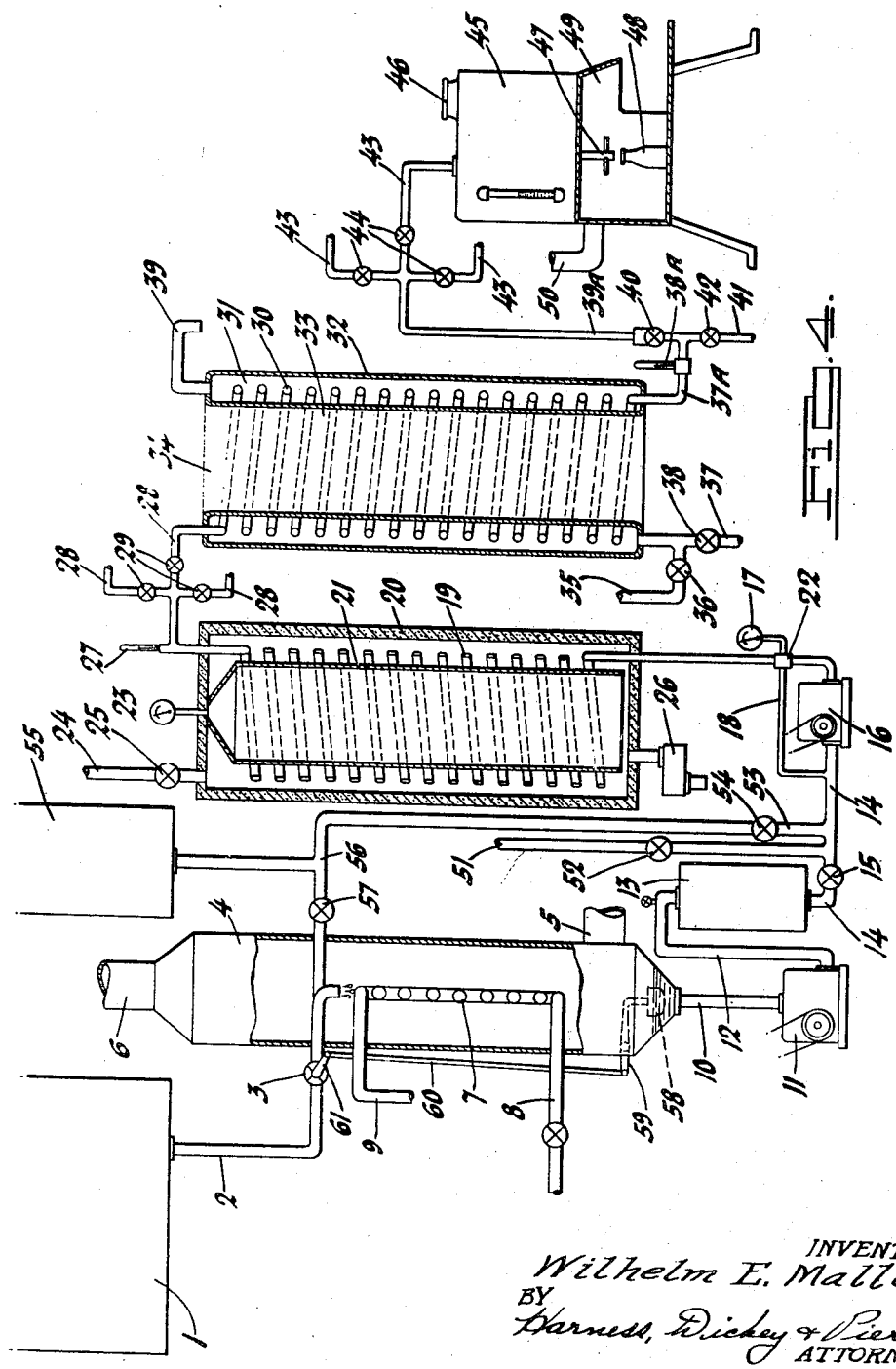
INVENTOR
Wilhelm E. Mallory.
BY
Barness, Dickey & Pierce.
ATTORNEYS.

Patented Jan. 20, 1942

2,270,540

UNITED STATES PATENT OFFICE 2,270,540

PROCESS OF TREATING LIQUIDS

Wilhelm E. Mallory, Ann Arbor, Mich.

Application February 16, 1938, Serial No. 190,813

5 Claims. (Cl. 99—215)

This invention relates to a process for treating liquids and is particularly adaptable to the sterilizing of perishable liquids, such as milk, orange juice, grapefruit juice, apple juice, and the like.

The main objects of this invention are to produce an improved process by the use of which perishable liquids may be sterilized by raising the temperature thereof to a sufficiently high degree to kill the bacterial growth therein, while at the same time not causing any chemical change in the liquid being sterilized which would affect or alter its taste, color or odor; to provide a process in which the liquid to be sterilized is handled in the sterilization apparatus in such a way that no portion of the liquid being sterilized is subjected to the sterilizing heat for a longer period of time than the remainder thereof, and to provide a process of sterilization which is fundamentally sound and empirically new.

In the accompanying drawings:

Fig. 4 is a view semi-diagrammatic of a complete apparatus used for the sterilization of milk, and which includes all of the units necessary for the sterilization of other liquids.

Figure 1:
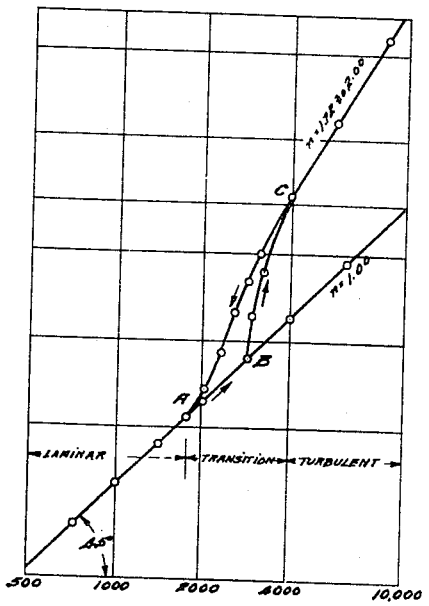
Figure 1 is a graph showing the pressure rise in the flow of liquids in a round smooth walled tube between the Reynolds number of 500 and 10,000 for liquids such as water.

The process herein to be shown and described is applicable to many kinds of liquids, but one of the main uses to which I have put the invention is in the treatment of milk, although I have successfully used it to a great extent in the sterilization of apple juice and to a lesser extent in the sterilization of orange and grapefruit juices.

The desirability of producing a sterilized milk which tastes substantially identical with fresh milk has long been recognized, and in the past many attempts have been made to produce such a milk. Repeatedly assertions have been made in the prior patent art and elsewhere that milk could be sterilized without any change in taste if heated with sufficient rapidity and then quickly cooled. Various types of apparatus have been proposed for securing this highly desirable result and usually comprised a coil of tubing within a tank in which steam is introduced to surround the coil, and a second tank of similar construction in which the coil is surrounded by a cooling medium and the milk was forced through this apparatus by a suitable pump.

Applicant has had extensive experience and made extensive inquiries, and to the best of his knowledge and belief no one has been able to produce a completely sterile milk which has been raised to a temperature of 275° F. to 300° F. in commercial production without imparting to the milk a characteristic cooked taste. This problem seems to have presented an insurmountable stumbling block to all endeavoring to solve it until at the present time the authorities are in agreement that milk can not be sterilized without changing its taste materially, which would indicate that no one heretofore seems to have thoroughly investigated the problem and analyzed the causes which produce the undesired change in taste.

As a laboratory experiment, it has been established for many years that cow's milk can be raised to a temperature of 300° F. for a period of as long as 5 or 6 seconds and, if immediately cooled, the taste of the milk will not be changed. It therefore became apparent in the development of the present invention that the change of taste which has been present in all of the prior art milk sterilizing devices must have been caused by subjecting some of the milk to a sterilizing temperature for a longer period of time than that which was intended, and that this milk which was subjected to the high temperature for the longer period of time was cooked and that the cooked milk imparted an undesirable taste to the remainder of the milk.

Adverting now to the subject of hydraulics, it was demonstrated by Osborne Reynolds in 1883 that there are two distinctly different types of fluid flow. He injected a fine thread-like stream of colored liquid in the entrance of a large glass tube through which water was flowing.

When the velocity of flow through the tube is small, this colored liquid is visible as a straight line throughout the length of the tube thus showing that the particles of water moved in straight parallel lines, but as the velocity of the water was gradually increased by permitting a greater quantity to flow through the tube, there was a point at which the flow abruptly changed.

It was then seen that instead of a single straight line the particles of the colored liquid were flowing in a very irregular fashion and forming numerous vortices. In a short time the color was diffused uniformly throughout the tube so that no straight lines could be distinguished. Later observations have been that in this type of flow the velocities and pressures are continuously subject to irregular fluctuations.

The first type of flow is known as laminar, streamline or viscous flow. The significance of these terms is that the fluid appears to move by the sliding of layers or laminations of infinitesimal thickness relative to adjacent layers; that the particles move in definite and observable paths and streamlines, and it is also a flow that is characteristic of a viscous fluid, or at least a flow in which viscosity plays a significant part.

The second type is known as turbulent flow, and any single particle of the flowing stream follows an irregular and erratic path. A distinguishing characteristic of turbulence is its irregularity, there being no definite frequency as in wave action or any observable pattern, as in the case of eddies.

Large eddies and swirls and irregular movements of large bodies of fluid which can be traced to obvious sources of disturbance do not constitute turbulence, but may be described as a disturbed flow. By contrast, turbulent flow may be found in what appears to be a very smoothly flowing stream and one in which there is no detectable source of disturbance. The fluctuations of velocity and pressure are furthermore small and can often be detected only by special means of observation.

Figure 3:
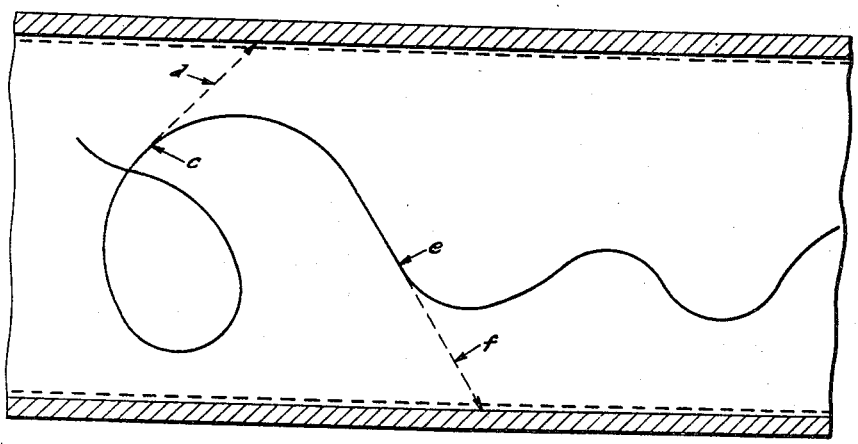
Fig. 3 is a diagrammatic view showing the path of a particle of liquid in turbulent flow through a tube.

The path of such a particle is shown in Fig. 3 of the drawings in which the particle at point $c$ is moving in the direction indicated by the arrow $d$, while at the point $e$ it is moving in the direction indicated by the arrow $f$.

It was determined by Reynolds and ten years later by Lord Rayleigh that if the drop in pressure in a given length of horizontal pipe is measured at different values of velocity, it will be found that as long as the velocity is low enough to secure laminar flow, the pressure difference will be directly proportional to the velocity, as shown in Fig. 1, but with increasing velocity at some point B where visual observance will show that the flow changes from laminar to turbulent, there will be an abrupt increase in the rate at which the pressure drop varies. If the logarithms of these two variables are plotted on linear scales, or if the values are plotted directly on logarithmic cross-sectional paper, it will be found that after a certain transition region has been passed, a line beginning at C will be obtained with a slope ranging from about 1.72 to 2.00. The lower value is found for a pipe with very smooth walls and with increasing roughness the slope increases up to the maximum of 2.00.

If the velocity is gradually reduced from a high value, the line C—B will not be retraced, instead the points will lie along the curve C—A. The value at B is known as the higher critical value, and that at A is known as the lower critical value. However, as Reynolds demonstrated, the velocity alone is not the deciding factor, instead, the true criterion is the value represented by the Reynolds number, the derivation of which is now well known. The upper critical value of Reynolds number is really indeterminate and depends upon the care to prevent any initial disturbance from affecting the flow. Laminar flow has been maintained up to values of R as high as 50,000, but this type of flow under such conditions is inherently unstable. Normally laminar flow is not to be expected at values of R above 3000. On the other hand it is practically impossible for turbulent flow to persist at values of R below 2000 because any disturbance that is set up will be damped out. This lower value is much more definite than the other and is really the dividing point between the two types of flow. Hence it may be defined as the true critical Reynolds number.

Figure 2:
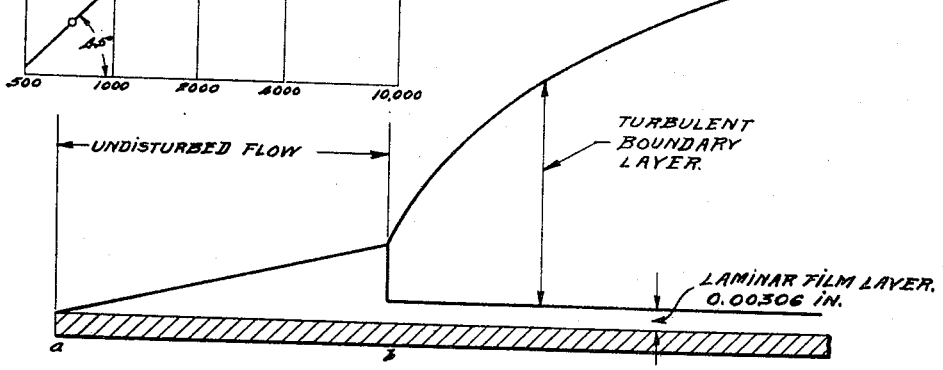
Fig. 2 is a graph showing the pressure rise during undisturbed flow and later during turbulent flow with the accepted laminar film layer.

As represented in Fig. 2 of the drawings, fluid flowing along the surface of the pipe in undisturbed or laminar flow from the point $a$, a laminar boundary layer forms with a thickness which increases, as shown, up to some critical value at $b$, at which point it abruptly drops to a smaller value which then remains constant, according to the teachings of authorities at the present time, and which is generally referred to as the "laminar film."

Between $a$ and $b$ there is merely the laminar boundary layer separating the surface of the pipe from the undisturbed flow, and the velocity profile is a straight line. But at $b$ begins a turbulent boundary layer which increases in thickness much more rapidly than did the original laminar layer, and it continuously increases in thickness along the length of the surface.

It is with this "laminar film" layer which separates the pipe surface from the turbulent boundary layer, the velocity of which has heretofore been assumed to be zero by reason of the fluid adhering to the solid surface, with which this invention is most concerned. The plotting of a velocity curve typical of turbulent flow as obtained in pipes, shows that the local velocities throughout the central portions are far more uniformly distributed than in the case of laminar flow, in fact over a range the velocities differ only slightly from the maximum at the center. This accounts for the high value of the average velocity in relation to the maximum velocity. A more rapid decrease of velocity is observable only in the portion nearest to the wall. Even then measurements with a Pitot tube, no matter how close to the solid boundary, always disclose the presence of a relatively large velocity, indicating that within the closest practical proximity to the surface there is a substantial velocity which in broad terms one could qualify as a wall velocity.

Thus on the outward appearance of things one could imagine the fluid body agitated by turbulent motion as tearing past the wall surface in block fashion with only an infinitesimal layer between it and the solid boundary. From a mechanical point of view the presence of a wall velocity to the closest measurable proximity to the wall would indicate that the transition to the zero velocity which is taken to prevail at the locus of adherence of the flow to the solid surface takes place within an extremely thin layer marked by an exceedingly high velocity gradient. The most of this film is taken to follow the laminar pattern, and hence the appellation,—"laminar film."

The presence of a solid boundary renders impossible cross current motions actuating the momentum exchange so that in the immediate proximity of the wall surface the mixing length by necessity must be zero. It has been long recognized therefore that no matter how the turbulent agitations may predominate in the central portions of a fluid body, near the wall their action must be reduced to zero so that the transfer of the tangential stress must depend wholly on viscous action, thus arranging the motion of a laminar film or of a fluid layer intermediate between the solid boundary surface to which it adheres and the main fluid body in turbulent motion into which the laminar film passes over a short transition zone. The thickness of this film is considered usually to be very small and measured in thousandths of an inch so that the difference in thickness between the actual laminar zone and the transition region is scarcely traceable. In other words, in actual flow turbulent momentum exchange starts very near the solid boundary surface and it requires special delicate experimental technique to actually penetrate into the laminar coating. This laminar film is of course not to be confused with Prandtl's boundary layer.

The foregoing teachings have been to a great extent clarified by my own experiments with the sterilization of milk. As an example, it was found that in passing milk through a ⅜" tube at 6 to 8 feet per second and raising it to a temperature of 275° to 300° F. over a period of 5 to 7 seconds, the laminar film of milk would be so completely cooked after a fifteen minute run of the apparatus that it had formed a flexible tubular coating on the inside of the tube which could be removed as a tube of cooked milk. Milk so sterilized had a distinctly cooked taste.

By increasing the velocity at which the milk was passed through the tube, it was discovered that a laminar film of cooked milk would be formed but would flake off.

This result indicated that a possible further increase in flow might cause the particles of fluid in turbulent flow to be projected against and impinge upon the interior walls of the tube following the paths of the projected arrows $d$ and $f$ in Fig. 3, with sufficient force to prevent the formation of any laminar film within the tube. This was done with the result that although the milk was raised to the required sterilizing temperature, no laminar film was formed within the tube and therefore no particle of milk was subjected to the sterilizing heat for a period of more than 5 seconds with the result that the milk was completely sterilized without any change of taste whatever. These experiments conclusively proved that a velocity of flow could be reached in which the scouring or scrubbing action of the fluid against the walls of the tube was sufficient to prevent the formation of any laminar film whatever, the deposit of which would mean that the milk would be heated for a longer period of time and such cooked milk would impart an unnatural taste to the balance of the milk passing through the tube when disseminated therethrough.

Obviously the velocity of flow is dependent upon the size of the pipe, and, as a result of a large number of experiments, I have found that when I very greatly exceeded accepted rates of fluid flow and the velocity of flow in feet per second multiplied by the ratio of the tube interior surface to the tube volume is greater than the empirical figure of 150, it would produce a condition in which no laminar film is present during the sterilization of milk. The working out of this problem in connection with a tube having 0.5" inside diameter is as follows:

The volume of 1" of such tube equals 3.1416×.0625 (radius squared) equals .19634. The surface area is 3.1416×.5 equals 1.5708. 1.5708 divided by .19634 equals 8, which is the ratio of the interior wall surface to the volume contained therein. Dividing this ratio into an empirical figure of 160 gives a velocity ratio of 20 feet per second which is well above the lower limit of the figure 150. Thus it is seen that if the milk is passed through ½" I. D. tube at a rate of from 19 to 20 feet per second, there will be no formation of laminar film and therefore no part of the milk will be cooked by reason of being exposed to the sterilizing heat for a longer period of time than is calculated for the apparatus which, in this instance, was 5 seconds. Thus it is seen that the tube through which the milk passed was 100 feet in length, and the temperature to which it was raised was 300° F.

The ratio of the interior tube surface to the volume contained therein is in inverse proportion to the diameter so that in a tube 1" inside diameter, the ratio is 4, which ratio divided into the figure 160 would indicate that the velocity of flow must be not less than 40 feet per second. In the case of a ¼" I. D. tube, the ratio is 16, which indicates that the rate of flow which will prevent the formation of the laminar film must be not less than 10 feet per second. The formula for securing this result is as follows:

$$\frac{S}{Vo} \times Ve = 150$$

in which
S is the interior wall surface
Vo is the volume of the tube, and
Ve is the velocity in feet per second.

It will be understood, of course, that the velocity of flow required to prevent the formation of a laminar film in any given tube is also dependent upon the viscosity of the liquid being passed through the tube. The greater the viscosity the greater the velocity, but not proportionately.

In the sterilization of fruit juices, such as orange, grapefruit, apple, etc. each has a different viscosity and the velocity of flow must be varied according to these various viscosities. Also, fresh sweet milk will vary in viscosity, one of the factors being the butter fat content, and the velocity of flow may have to be varied to cover the extremes.

Thus, in the event that it is desired to sterilize or pasteurize some other liquid having a still greater viscosity than water, then an increase in the velocity of flow would necessarily be required in order to pass the liquid through the tube without forming a laminar film on the tube wall.

It is fully appreciated that the pumping pressure required to attain the necessary velocity of flow which will prevent the formation of a laminar film is not an efficient and economical handling of the liquid, and therefore would not ordinarily be used in hydraulics where the problem is one of pumping and transporting liquids in the most economical manner. The pressures required for securing the necessary velocity to prevent the formation of laminar film are much higher than ordinarily used and are beyond the range of the scale set forth in Fig. 1 of the drawings, but it is this extra high velocity and uneconomical forcing of the fluid through the heating tube which secures the desired result, i. e. the preventing of the formation of a laminar film.

As is well known, milk is one of the most difficult of liquids to sterilize because it is an ideal medium in which bacteria will propagate. In the sterilization of such liquids as fruit juices. it is not necessary to attain the same degree of heat, and I have found that by raising the temperature of fruit juices from 200° F. to 220° F., they will be sterilized so that no bacterial change will take place therein over long periods of time.

It will be understood that the sterilization and packaging of different liquids requires various forms of apparatus. Inasmuch as the sterilization of milk requires substantially all of the apparatus used for fruit juices in addition to several units not applicable to fruit juices, the apparatus which I am successfully using for milk will be described in detail as an illustrative example, and it will be obvious that such units as aerators and homogenizers will not be used when sterilizing fruit juices.

Referring to Fig. 4 of the drawings, the milk is taken from a suitable source such as the reservoir 1 and conducted through the pipe 2 provided with the shut-off valve 3 to the interior of a deodorizing chamber 4. The deodorizing chamber 4 is provided with a clean air inlet 5 toward the bottom, and an outlet stack 6 at the top, by means of which a continuous draft of clean air or other gas is circulated upwardly through the chamber and past a heating coil 7 which is connected with a hot water inlet pipe 8 at the lower end and an overflow pipe 9 at the upper end.

The pipe 2 from the reservoir 1 has an outlet inside the low pressure chamber 4 immediately over the coil 7, so that the milk flowing from the pipe 2 will cascade down the heater coil, and in so doing any gases having a foreign or obnoxious smell will be driven off and carried up the stack 6.

The deodorized and aerated milk drips from the coil 7 to the bottom of the container and passes through a pipe 10 to an homogenizer 11 which finely divides the fat particles in the milk better to absorb heat and not coalesce later on during transportation and storage.

After leaving the homogenizer 11, the milk is passed through a pipe 12 to a vented storage tank 13, and thence through a pipe 14, having a valve 15, to a pump 16, fitted with a pressure gauge 17, and leading to a sterilizing coil 19 contained within a cylindrical insulated tank 20, and around an inner cylindrical shield 21 suspended from the top center of the tank and spaced from the lower end thereof.

The pump 16 is shown fitted with a return by-pass pipe 18, and a pressure relief valve 22, whereby the pressure on the delivery side of the pump may be maintained constant.

A steam pressure gauge 23 is fitted to the top of the tank 20, and leads to the interior of the shield 21, and a steam inlet pipe 24 with a control valve 25 is connected to the top of the tank for supplying the necessary steam under pressure to fill the interior of the tank around the coil 19 and inside the shield 21 to the pressure indicating gauge 23, the condensate from the steam being discharged through a float-operated steam trap 26 leading from the lower end of the tank.

The sterilizing coil 19, like the rest of the piping, fittings and apparatus through which the milk passes, must be made of metal that is immune to any acid or other chemical action that may be caused by the milk, and the sterilizing coil in particular is preferably made of a non-corrosive alloy, and with a tubing of approximately one-half inch inside diameter is preferably slightly flattened as shown, so that a given cross-sectional area will expose more surface to the liquid flowing on the inside and the steam surrounding the outside for a quick heat exchange.

The upper end of the sterilizing coil 19 passes through the top of the tank 20, and is fitted with a thermometer 27, and leads to one or more distributing pipes 28 controlled by valves 29. One of the pipes 28 is shown connected to a cooling coil 30 contained within the cooler 31 formed between two cylindrical walls 32 and 33 joined top and bottom to leave an open-air space 34 through the center.

The cooler 31 is normally supplied with cold water or other refrigerant medium through an inlet pipe 35 at the bottom, controlled by a valve 36 and fitted with a drain pipe 37 and drain valve 38, while the top of the tank is vented by an overflow pipe 39.

The cooling coil 30, where it leaves the cooler, is connected to a pipe 37A, fitted with a thermometer 38A, and in turn connects with a pipe 39A having a valve 40 which is adjusted to a desired maximum pressure but may also be shut off entirely, and a drain pipe 41 which is controlled by a valve 42.

The pipe 39A may be connected to branch lines 43 each controlled by a valve 44, one of which is shown leading to a receiving tank 45 fitted with a sterilizing breather 46, from which the milk may be dispensed through a trip valve 47 to containers 48 within a hood 49 to which sterile or inert gas is fed by a conduit 50.

In the operation of the apparatus, it must be understood that it is necessary to sterilize the tubing and connections through which the sterilized milk will run before the sterilized milk enters these passages, because if this is not done then the milk after being heated to an absolute sterile condition would pick up contamination in the unsterilized cooling tubing and sealing connections after being sterilized.

It is therefore necessary to run a sterilizing liquid such as water through the apparatus so that the water may be heated to a sterilizing temperature and carried along the tubing and through the entire apparatus through which the milk passes after it is first sterilized, for the purpose of sterilizing the apparatus, and after accomplishing the desired sterilization of the apparatus this condition may be adjusted for the purpose of preparing the controls to receive the milk for its processing.

At this time it seems opportune to explain that, unlike ordinary liquids, milk cannot be passed through an apparatus under ungoverned temperatures and then have conditions adjusted to sterilize the same and preserve the natural flavor, because, in the first place, it cannot be allowed to contact with any contaminated or unsterile material, and secondly, it must have passed through a cycle of rapid heating and cooling, which can only be accomplished under pressure,—otherwise the taste will be altered or the conduit will be coated and contaminated and the milk spoiled after sterilization; the understanding being that "sterilization" as referred to in this specification means rendering the normal bacterial life of the milk innocuous, but leaving unaltered the normal food ingredients, which are always a fertile ground for activity in the presence of bacteria or any fermentative.

For this purpose the pipe 14 leading to the pump 16 and/or to the sterilizing coil 19 is connected to a steam or hot water supply by the pipe 51 controlled by the valve 52. Furthermore, for purposes as hereinafter more fully explained the pipe 14 is connected by a pipe 53 controlled by a valve 54 with a wash-water storage tank 55, and this tank also has a branch pipe 56 controlled by a valve 57 leading to the inside of the aerator chamber 4 to a discharge opening over the coil 7.

In starting the process, the apparatus is first prepared with a comparatively innocuous liquid such as water, and the supply of cooling liquid to the cooler is cut off and drained through the valve 38 and pipe 37. Water is then preferably fed to the apparatus through the pipe 51 with the valve 15 closed, so that the flow of water must pass through the pump 16 and by-pass 18, either by leakage or operation, to the pipe leading to the sterilizing coil 19, and on through the pipe 28 to the cooling coil 30 and the remaining apparatus, and be so governed that the final discharge will be at a temperature and pressure that will sterilize.

With the apparatus conditioned as above explained, it is ready to change over to sterilize a liquid such as milk, and this is done by merely shutting off the water supply valve 52 and opening the milk supply valve 3, it being understood that the aerating heating coil 7 has been put in operation, and likewise the homogenizer 11 and pump 16; and in this connection it may be further explained that the flow of milk from the reservoir 1 may be automatically adjusted by any suitable means such as a float 58 in the lower part of the aeration chamber 4 attached to a lever 59 pivotally arranged in the chamber whereby its outer end, through the medium of a rod 60, will operate a lever 61 operating in connection with the valve 3 to open or close the same in accordance with the flow of milk through the apparatus.

The milk will flow from the pipe 2 over the heating coil 7 in the aerating chamber 4 and all foreign odors will be released therefrom and carried upward through the stack 6.

Furthermore, the milk will flow uninterruptedly from the lower end of the aerating chamber through the pipe 10 to the homogenizer 11, wherein the fat globules are broken up into proper colloidal form, and through the milk storage tank 13, the pump 16 and on through the rest of the apparatus.

It will now be understood that several factors must have been correlated, viz.—the proper velocity of liquid flow through the apparatus must have been established, and likewise the temperature of the sterilizing coil and the cooling coil must have been adjusted, so that the first milk passing through the apparatus is properly piloted and controlled, not only by the water that has preceded the flow of the milk uninterruptedly, but also by the cooperatively controlled temperatures, turbulence and time in accordance with the pump giving the requisite pressure and speed, and the size of the tubing to give the desired heat transfer and back pressure.

In further explanation it should be understood that after the apparatus has been in operation for the desired time, and the supply to be sterilized has been exhausted, then it is important that the manner of shutting down is correct and that the apparatus is properly cleaned, so that the next time it is put into operation it will function properly.

As the milk is nearing the end of the supply, it is possible and highly recommended that water should follow the milk through the apparatus and be sterilized, the same way that the milk followed the water when the apparatus was put into operation. Then when the water is again flowing through the apparatus, the steam valve 52 may be closed and the water continued through the apparatus until the heater has cooled down to a temperature at which the heat will not coat the tube walls. After the water has flushed out the milk and cooled the heater down, the cooling water can be shut off and the flow of water inside the tube can be safely stopped.

Arrangements can be incorporated in the design so that a supply of washing solution can then be forced through the apparatus to remove and dissolve any milk particles that have adhered to the pipes, connections, pump valves, etc., that do not have a high velocity. After this wash water has been circulated through the apparatus, the pump can again be shut down.

It is recommended that the supply of wash water be so situated that the liquid will continue to flow slowly through the apparatus by a siphoning action caused by locating the wash water supply so that a small amount of head is available to force the wash water through the apparatus at a very slow rate of flow. This slow flow of washing solution can continue to flow through the apparatus until the next day's run is to be made, when again the pure water may be used to regulate the controls and sterilize the apparatus.

Actual operating tests with cow's milk show that the complete process of sterilization and subsequent cooling and dispensing in a sterile condition gives a product that is indistinguishable from the original milk as regards taste and color, while the curd condition is decidedly improved for digestion and none of the vitamins are apparently disturbed.

It should be understood that I do not limit myself to the construction and arrangement of apparatus as shown in the accompanying drawings and described in this specification, as the same is only exemplary of the invention and may vary with the nature of the liquid being treated, such as fruit juices of various kinds; and likewise the capacity of the apparatus will necessarily require modifications well within the scope of the invention.

What is claimed is:

1. The process of sterilizing liquids which comprises the passing of the liquid through a heated tube to raise the temperature thereof to a sterilization point, the velocity of flow through said tube being such as to cause the turbulent boundary layer to extend substantially entirely to the tube wall and thereby substantially eliminate the laminar film and then promptly cooling the sterilized liquid while maintaining substantially the same velocity of flow.

2. The process of sterilizing liquids which comprises the passing of the liquid through a heated tube to raise the temperature to a sterilization point, the velocity of flow through said tube in feet per second multiplied by the ratio of the tube interior surface to the tube volume equalling not less than the empirical figure of 150 for liquids having a viscosity of substantially 1, and then promptly cooling the sterilized liquid while maintaining substantially the same velocity of flow.

3. The process of sterilizing liquids which comprises the passing of the liquid through a heated tube to raise the temperature thereof to a sterilization point, and then passing the liquid through a cooling tube to lower the temperature thereof substantially as rapidly as its temperature was raised, the velocity of flow through both said heating and cooling tubes being such as to cause the turbulent boundary layer to extend substantially entirely to the tube wall and thereby substantially eliminate the laminar film thereon.

4. The process of sterilizing liquids which comprises the passing of the liquid through a heated tube to raise the temperature to a sterilization point, and then passing the liquid through a cooling tube to lower the temperature thereof, the velocity of flow through both of said tubes in feet per second multiplied by the ratio of the tube interior surface to the tube volume equaling not less than the empirical figure of 150 for liquids having a viscosity of substantially 1, whereby the laminar film layer is substantially eliminated.

5. The process of treating liquids which comprises the passing of the liquid through a heated tube to raise the temperature thereof to a predetermined point, the velocity of flow through such tube being such as to cause the turbulent boundary layer to extend substantially entirely to the tube wall and thereby substantially eliminate the laminar film and then promptly cooling the treated liquid while maintaining substantially the same velocity of flow.

WILHELM E. MALLORY.